United States Patent [19]

Fritz et al.

[11] 4,204,134

[45] May 20, 1980

[54] COOLANT LOOP FOR THE ROTOR OF A TURBOGENERATOR WITH A SUPERCONDUCTIVE EXCITER WINDING

[75] Inventors: Werner Fritz, Bochum; Erich Weghaupt, Mülheim an der Ruhr, both of Fed. Rep. of Germany

[73] Assignee: Kraftwerk Union Aktiengesellschaft, Mülheim an der Ruhr, Fed. Rep. of Germany

[21] Appl. No.: 890,288

[22] Filed: Mar. 27, 1978

[30] Foreign Application Priority Data

Mar. 29, 1977 [DE] Fed. Rep. of Germany ....... 2713885

[51] Int. Cl.$^2$ ............................................. H02K 9/00
[52] U.S. Cl. ....................................... 310/52; 310/64; 310/261
[58] Field of Search .................. 310/10, 40, 52, 261, 310/64; 62/505; 336/DIG. 1

[56] References Cited

U.S. PATENT DOCUMENTS

| | | | |
|---|---|---|---|
| 3,648,082 | 3/1972 | MacNab | 310/10 |
| 3,679,920 | 7/1972 | MacNab | 310/10 |
| 3,942,053 | 3/1976 | Abolins | 310/10 |
| 3,956,648 | 5/1976 | Kirtley | 310/10 |
| 4,039,870 | 8/1977 | Sterrett | 310/52 |
| 4,079,273 | 3/1978 | Lambrecht | 62/505 |
| 4,082,967 | 4/1978 | Caskaris | 310/64 |
| 4,091,298 | 5/1978 | Gamble | 310/52 |
| 4,092,555 | 5/1978 | Ting | 310/52 |
| 4,123,676 | 10/1978 | Cooper | 310/52 |

*Primary Examiner*—R. Skudy
*Attorney, Agent, or Firm*—Herbert L. Lerner

[57] ABSTRACT

A coolant circulatory loop for a turbogenerator rotor having a superconductive field winding and a damper and cold shielding surrounding the field winding, the field winding being cooled by deeply-cooled liquid helium, and the damper and cold shielding by an at least partly vaporized partial flow of helium that has flowed through the field winding, includes a mixing chamber, means for feeding liquid helium in forced circulation from the mixing chamber to the field winding wherein it is heated due to winding losses and pressure reduction and is partly evaporated, means located in the rotating rotor for recooling the non-evaporated helium by removing heat of vaporization therefrom and returning the thus recooled helium to the mixing chamber, cooling means external to the rotor for recooling the partial flow of helium after it has cooled the damper and cold shielding and means for feeding the recooled partial flow of helium back to the mixing chamber.

12 Claims, 2 Drawing Figures

COOLANT LOOP FOR THE ROTOR OF A TURBOGENERATOR WITH A SUPERCONDUCTIVE EXCITER WINDING

The invention relates to a coolant loop for the rotor of a turbogenerator with a superconducting field or exciter winding and a damper and cryogenic or cold shield surrounding the field winding, the field winding being cooled with deeply-cooled liquid helium, and the damper and cryogenic or cold shield with an at least partly vaporized partial flow of the helium that has flowed through the field winding, and the coolant is partly recooled within the rotating rotor.

Such a coolant circulatory loop has become known heretofore from German Published Non-Prosecuted Application DT-OS 2 028 158 wherein the warmed-up helium is recooled by the provision that compression and partial recooling occurs outside the rotor, while the remaining temperature reduction occurs in a refrigerating or cryogenic unit inside the rotor. This means, however, that all the helium must always be removed from the rotor and then returned to it. With an additionally provided serial connection of the cooling system of the field winding and the damper winding or damping shield as well as of the cooling system of further cryogenic or cold shields (as is also shown, for example, in German Published Non-Prosecuted Application DT-OS 24 42 277); however, for an optimal heat transfer coefficient at the superconducting field winding, a mass throughput or flow rate which would be much too large for cooling the damper and for an economic construction of the refrigeration or cryogenic unit would result. If, on the other hand, the mass throughput is set to the demand of the damper and cryogenic or cold shield, a low heat transfer coefficient is obtained in the superconducting field winding because of the insufficient throughput.

In addition, an evaporation cooling system, in which the coolant throughput required for cooling can be reduced, has already been proposed heretofore in the form of a so-called bath cooling system i.e. the helium flows around the superconducting winding and, during rotation, the natural circulation resulting from temperature differences is utilized for removing the heat. In such a system, however, the heat transport is too sluggish in special operational situations such as sudden load changes or a short circuit; because the coolant flow is not subject to any previously applied pressure, local heat pockets can develop.

It is an object of the invention to provide a circulatory coolant loop of the foregoing type wherein the advantages of evaporation cooling are indeed utilized but wherein optimal cooling of all parts of the installation is reliably assured even in special operational situations, such as sudden load changes, short circuits or unbalanced loads, and wherein additionally, the external refrigeration or crygenic unit can be kept very small, so that the coolant connecting head can be of very simple construction.

With the foregoing and other objects in view, there is provided, in accordance with the invention, in a coolant circulatory loop for a turbogenerator rotor having a superconductive field winding and a damper and cold shielding surrounding the field winding, the field winding being cooled by deeply-cooled liquid helium, and the damper and cold shielding by an at least partly vaporized partial flow of helium that has flowed through the field winding, a mixing chamber, means for feeding liquid helium in forced circulation from the mixing chamber to the field winding wherein it is heated due to winding losses and pressure reduction and is partly evaporated, means located in the rotating rotor for recooling the non-evaporated helium by removing heat of vaporization therefrom and returning the thus recooled helium to the mixing chamber, cooling means external to the rotor for recooling the partial flow of helium after it has cooled the damper and cold shielding and means for feeding the recooled partial flow of helium back to the mixing chamber.

With this cooling system according to the invention, and by utilizing heat of vaporization, it is possible to apply forced-circulation cooling in the winding chamber of the superconducting field winding and, thereby, attain a high coolant velocity in defined cooling channels. Furthermore, the helium mass throughput of the refrigeration or cryogenic unit is considerably reduced.

Since, in many cases, the helium vapor produced from the field winding losses alone is insufficient for cooling the damper and cryogenic or cold shield which encloses the superconducting winding, yet the temperature of the damper must be as low as possible for proper functioning, there is provided, in accordance with the invention, additionally, a branch line for conducting at least part of the partial helium flow from the helium flow immediately downstream from the field winding, in flow direction of the helium, for cooling the damper and the cold shielding. It is then also possible, in accordance with another feature of the invention, to cool the damper shield solely with the partly vaporized partial helium flow and the radially outer cryogenic or cold shield with helium vapor alone.

In accordance with other features of the invention, radially inwardly relative to the field winding chamber, an evaporating chamber for evaporating helium, which is partly filled with liquid helium, is provided; from this evaporating chamber, a cooling line extends to the damper and cryogenic or cold shield, and the mixing chamber for the non-evaporated i.e. liquid, helium is provided in a coolant connecting head enclosing the end of the rotor shaft, the mixing chamber being in communication both with an axial feed line for the liquid helium to the field winding and an external cooling unit for recooling the helium vapor. The evaporating chamber is advantageously constructed, in accordance with the invention, as a concentric annular chamber disposed within the field-winding chamber, and extends over the entire length of the field winding, the warmed-up helium being introduced into the annular evaporating chamber, in this annular chamber, a cylindrical evaporation surface is formed between the radially outer liquid helium and the radially inner vaporized helium.

In accordance with an added feature of the invention, the mixing chamber in the coolant connecting head is preceded i.e. disposed upstream thereof, by a collecting chamber which surrounds coolant outlet openings formed in the rotor shaft and which is in communication with the mixing chamber.

To reduce the pressure of the vaporized helium, in accordance with yet another feature of the invention, the coolant outlet openings of the rotor shaft are disposed at a greater radius from the rotor axis than that at which the cylindrical helium evaporating surface in the vaporizing chamber is disposed. The rotor shaft end formed with the coolant openings is constructed as a suction pump, in accordance with yet a further feature of the invention.

In accordance with an added feature of the invention, a helium vapor cooling line for the cryogenic or cold shield extends radially from the vaporizing chamber to the cold shield and passes through the evaporating surface.

In accordance with an additional feature of the invention, the collecting chamber is associated axially with two additional collecting chambers, which enclose the rotor shaft and are sealed against the latter, the two additional collecting chambers receiving the helium flowing from the damping and the cryogenic or cold shield,, respectively and being connected to the external refrigeration or cooling unit.

To maintain the pressure of the inflowing coolant, in accordance with yet an additional feature of the invention, a pressure regulating valve is provided in a connecting line between the refrigerating or cooling unit and the mixing chamber.

In order to lower the temperature of the incoming liquid even further and utilize heat of vaporization, in accordance with a concomitant feature of the invention, a heat exchanger is disposed between the vaporizing chamber and the axial coolant feed line. Other features which are considered as characteristic for the invention are set forth in the appended claims.

Although the invention is illustrated and described herein as embodied in a coolant loop for the rotor of a turbogenerator with a superconductive exciter winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
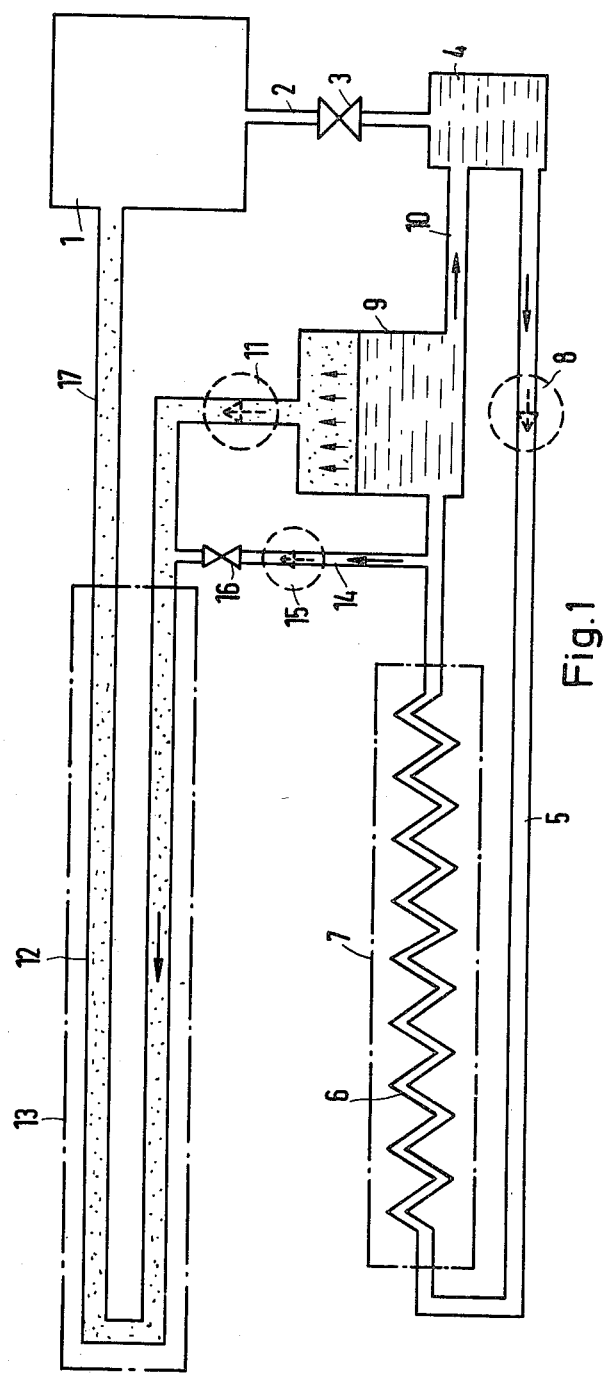
FIG. 1 is a basic circuit diagram of a cooling loop.

Referring now to the drawing and first, particularly, to FIG. 1 thereof, there is shown a helium circulatory loop in a schematic view. The pumping effect resulting from the varying radii during rotation of the rotor is symbolically indicated by pumps.

From an external cryogenic or refrigeration plant 1, liquid helium flows at about 4.2 K into a mixing chamber 4 through a line 2 and a control valve 3. The pressure in this mixing chamber 4 is controlled to a constant pressure of about 1.2 bar by the control valve 3. The liquid helium is fed through a feed line 5 to cooling channels 6 of a superconducting field winding 7; the symbolic pump 8 representing the provision of a high mass throughput or flow rate and a correspondingly high coolant velocity in these cooling channels 6. This high flow velocity in the cooling channels 6 ensures a minimal temperature jump between the superconducting field winding 6 and the coolant at a winding temperature of about 4.5 K. Moreover, this forced flow is capable of cushioning sudden loss increases in the event of abnormal operating conditions. The helium leaving the superconducting field winding 7 is delivered into an evaporator 9, the internal pressure of which is kept constant by the control valve 3 over the connecting line 10. A constant evaporation temperature then becomes set in the evaporator 9; the lower pressure can be kept in the evaporator 9, the lower the temperature will be therein. The amount of vapor accruing, with the pressure in the evaporator 9 being held constant, is proportional to the winding losses to be removed. Through measures described in further detail hereinafter, the evaporation pressure and also the coolant temperature therewith in the evaporator 9 and the connecting line 10 can additionally be reduced.

The major part of the liquid coolant flows back into the helium mixing chamber 4 through the connecting line 10. Thus, the following circulatory loop is produced for the low-temperature flow: Mixing chamber 4, pump 8, cooling ducts 7, evaporator 9 and back to mixing chamber 4.

The helium vapor accruing in the evaporator 9 is conducted into the cooling channels 12 of a damping shield and/or a cryogenic or cold shield 13 by means of a symbolic pump 11 at about 4 to 5 bar and about 5 to 7 K.

To remove the damping and cold, shield losses at damping temperature that remains electrically acceptable, an additional amount of helium is frequently required, which is branched off behind or downstream of the cooling channels 6 of the superconducting field winding, in direction of coolant flow, and is fed to the cooling ducts 12 of the damper 13 through a line 14 as well as a symbolic pump 15 and a throttling valve 16. This additional quantity of helium is adjustable by the valve 16.

After the helium gas has absorbed the damping and cold shield losses, the helium gas is fed to the refrigeration or cryogenic plant 1 at 80 to 100 K through a line 17. In this refrigeration or cryogenic unit 1, the coolant is cooled down to 4.2 K and returned to the mixing chamber 4. There, it is mixed with the low-temperature flow from the evaporator 9.

With this cooling principle, the recooling of the liquid helium warmed-up in the superconducting field winding 7 is thus accomplished solely by evaporation of a portion of the helium and, consequently, by utilization of the heat of vaporization of the liquid helium; the extent of evaporation can be adjusted by an appropriate underpressure or negative pressure, as will be explained hereinafter in greater detail.

Figure 2:
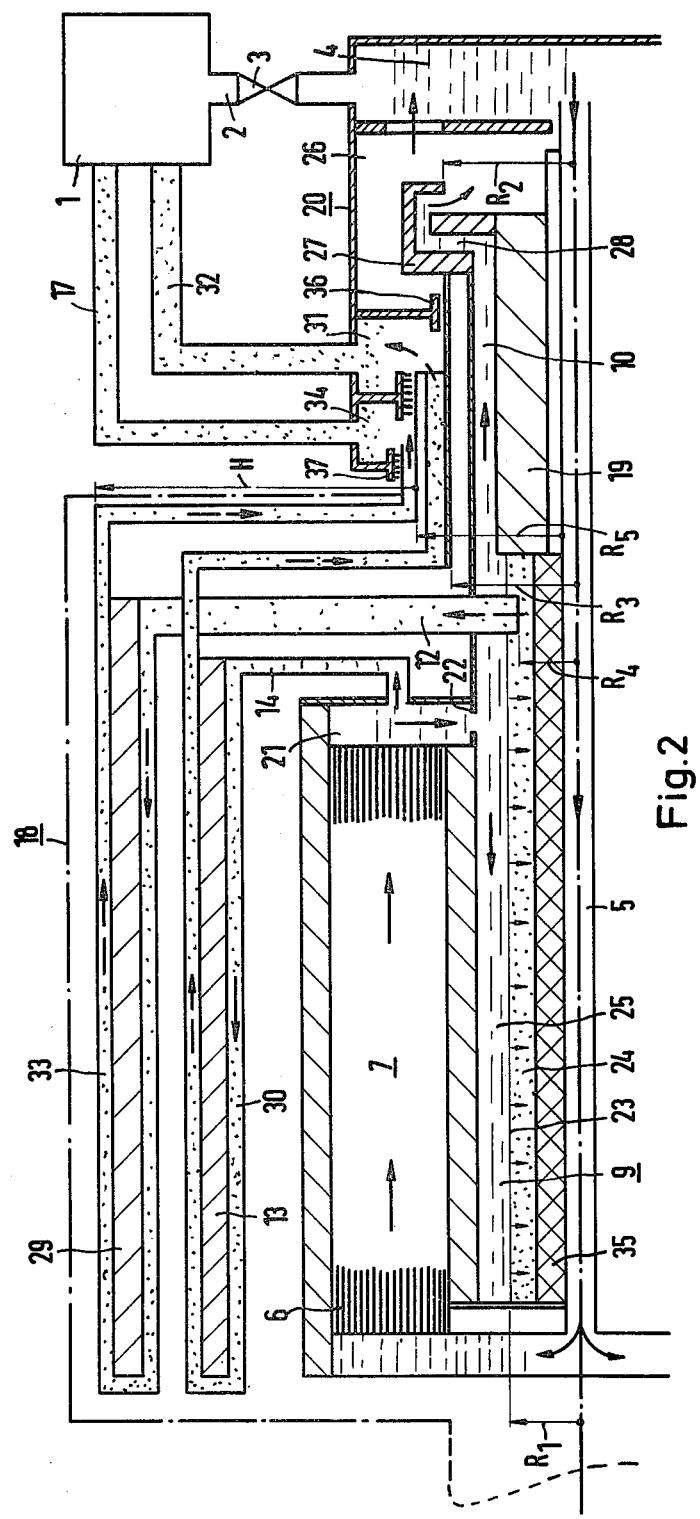
FIG. 2 is a diagrammatic view of a rotor with a superconducting field winding and a corresponding cooling loop and showing the construction principle thereof.

In FIG. 2, the mechanical construction or layout of the circulatory cooling loop in a rotor with a superconducting field winding is shown in principle. The diagrammatically illustrated rotor 18, a half-section of which is surrounded at the rotor shaft end 19, on the coolant-connection side thereof, by a stationary coolant connecting head 20, from which lines, that are to be described hereinafter, lead to the refrigeration or cryogenic unit 1. At the end face thereof, this coolant connecting head 20 has the hereinafter described mixing chamber 4, which is in communication with the refrigeration or cryogenic unit 1 over the line 2. From this mixing chamber 4, the liquid, deeply-cooled helium is fed through the axial feed line 5 in the rotor 18 to the cooling channels 6 of the superconducting field winding 7. Concentrically between the winding space 7 and the axial feed line 5, the evaporator 9 is provided in the form of an annular chamber into which warmed-up helium from the cooling ducts 6 is introduced through a plenum or collecting chamber 21 and a throttle location 22. Due to the evaporation of the helium, a cylindrical evaporation surface 23 is developed in this evaporator 9 by the rotation of the rotor 18, whereby the evaporator 9 is, for all practical purposes, divided into a vapor chamber 24 and a liquid chamber 25. A radial distance $R_1$ from the rotary axis to the evaporation surface 23 and the specific helium column expected thereby builds up a usable pump head of more than 2 bar, during rotation of the rotor, and corresponds therewith to the symbol of the pump 8 in FIG. 1. This pressure is sufficient to pump the coolant with high velocity through the cooling channels 6 of the superconducting field winding 7.

The liquid helium from the annular region 25, recooled by removal of heat of vaporization, can then return through the connecting line 10 into a plenum or collection chamber 26, preceding or upstream of the mixing chamber 4 in the coolant connecting head 20. To lower the pressure in the evaporation chamber 9 further, it is advantageous if the coolant outlet openings at the end of the connecting line 10 lie on a larger radius than the helium evaporation surface 23 in the evaporation chamber 9 i.e. if the exit shaft end is constructed as a suction pump 27. The suction effect of the pump 27 is thereby produced by the difference of the radii, $R_2-R_1$. The pump 27 may be formed only of radial shaft channels 28, which do not require much constructional expense. The greater the underpressure or negative pressure in the evaporator 9 becomes due to the choice of the radii difference, $R_2-R_1$, the lower will be the evaporator temperature, regardless of the losses in the superconducting field winding 7. The setting of the underpressure or negative pressure is optimized by adjusting the winding outlet by means of the throttle 22.

For optimal cooling of the damper shield 13 and a cryogenic or cold shield 29 disposed farther outward radially therefrom, the following measures, deviating slightly from the principle according to FIG. 1 have been taken: The damping shield 13 is cooled only by a partial flow of the helium which has flowed through the superconducting field winding 7, that partial flow being branched off through the branch line 14 behind or downstream of the cooling channels 6 and flows around the damping shield 13 through cooling channels 30. The helium evaporating in the process is introduced into a further collecting chamber 31 in the coolant connecting head 20 and is fed through a connecting line 32 to the refrigeration or cryogenic unit 1, where it is recooled. The coolant pressure (symbolized in FIG. 1 by the pump 15) then occurring results from the difference of the radii $R_1$ and $R_3$.

The evaporated helium from the vapor chamber 24 of the evaporator 9 is used alone for cooling an outwardly disposed cryogenic or cold shield 29 and fed for this purpose through a radial discharge line 12, which extends into the vapor chamber 24, to the cooling channels 33 of the cryogenic or cold shield 29. The helium, warmed up in this cryogenic or cold shield 29 to about 300 K, is then conducted into a further collecting chamber 34 in the coolant connecting head 20 and fed through the connecting line 17 to the refrigeration or cryogenic unit 1, from where, after being reliquified, it is returned to the mixing chamber 4. The pump head building up in this process, corresponding to the symbolic pump 11 in FIG. 1, is produced by the difference of the radii $R_5$ and $R_4$ which, together with the pumping effect of the difference in weight between cold and hot helium in the radial region H effects the coolant throughput through the cryogenic shield 29.

Another advantage is obtained with the hereinaforedescribed coolant loop: With appropriate construction of the suction pump 27, the evaporation temperature can be lowered by several tenths of a degree, although the pressure in the mixing chamber is even higher and amounts, for example, to 1.2 bar. Under these conditions, considerable simplifications are obtained for the layout or construction of the refrigeration or cryogenic unit 1, since the rotor, in that case, can be operated with liquid helium of 4.2 K and 1 bar. The technical expense of the refrigeration or cryogenic unit 1 therefore corresponds only to that of a helium liquefier. In addition, the rotor 18, under these conditions, can even be supplied only by a helium storage device (cryostat).

Since the temperature in the evaporator 9, under the given conditions is lower than the temperature in the mixing chamber 4 by about 0.5 to 0.7 K, the partition between the evaporator 9 and the axial feed channel 5 need not be insulated, for example, over the entire length thereof by an otherwise conventional vacuum gap, but rather, a heat exchanger 35 can be disposed thereat. The helium flowing in from the mixing chamber 4 is thereby cooled further yet to below 4.2 K before entering the superconducting winding 7. Through optimal construction of this heat exchanger 35, for example, by providing cooling fins, the heat transfer surface can be increased even further.

In summary, the following advantages are obtained with the new cooling system: The coolant outlet temperature of the low-temperature circulatory loop of the superconducting field winding is constant and independent of the winding losses, as long as no pressure change is produced in the evaporator. Loss variations in the superconducting field winding change only the amount of helium vapor produced. The vaporization temperature can, in addition, be lowered further by the suction pump. By utilizing the heat of vaporization, the helium mass throughput through the external refrigeration or cryogenic unit is reduced. The helium mass throughput of the superconducting field winding is a multiple of the amount of vapor, the large mass flow being returned into the rotor through the mixing chamber without loading the refrigeration or cryogenic unit. This use of forced circulation in the winding space and thereby, the attainment of a high coolant velocity in the defined cooling channels is thereby rendered possible.

Contrary to heretofore known forced-circulation cooling systems with separate circulatory loops for the superconducting winding and the damping and cryogenic or cold shield, a relatively simple construction of the connecting head 20 is obtained. As can be seen from FIG. 2, only a single cold seal 36 is required. The number of chambers in the connecting head 20 is limited to the mixing chamber 4 with the preceding or upstream plenum chamber 26 and two further collecting chambers 31 and 34, which are subjected to cooling medium of relatively high temperature, so that only a comb ring seal and no loss-free special seal is required as an outer seal.

There are claimed:

1. In a coolant circulatory loop for a turbogenerator rotor having a superconductive field winding, cooling ducts and a damper and cold shielding surrounding the field winding, means external to the rotor for transferring deeply-cooled liquid helium thereto for cooling the field winding, damper and cold shielding, the damper and cold shielding being cooled by an at least partly vaporized partial flow of helium that has flowed through the field winding, a rotating mixing chamber mixing deeply-cooled liquid helium from the external transferring means with liquid helium which has flowed through the cooling ducts of the field winding, means for feeding liquid helium in forced circulation from said mixing chamber to the cooling ducts of the field winding wherein it is heated due to winding losses and pressure reduction and is partly evaporated, means located in the rotating rotor for recooling the non-evaporated helium by removing heat of vaporization therefrom and returning the thus recooled helium to said mixing chamber forming a closed liquid helium loop inside the rotor with a separate partial flow of helium cooling the damper and cold shielding, cooling means external to the rotor for recooling the partial flow of helium after it has cooled the damper and cold shielding and means for feeding the recooled partial flow of helium back to said mixing chamber, the amount of helium flowing from said closed liquid helium loop inside the rotor through said mixing chamber being a multiple of the at least partly vaporized partial flow of helium flowing through the damper and cold shielding to said external cooling means.

2. Coolant circulatory loop according to claim 1 including a branch line for conducting at least part of the partial helium flow from the helium flow immediately downstream from the field winding, in flow direction of the helium, for cooling the damper and cold shielding.

3. Coolant circulatory loop according to claim 1 wherein the damper and cold shielding comprises a damping shield and a cold shield disposed radially outwardly from said damping shield, and including means for conducting the partly vaporized partial flow of helium that has flowed through the field winding solely to one of said shields for cooling the same, and means for conducting a flow of vaporized helium solely to the other of said shields for cooling the same.

4. Coolant circulatory loop according to claim 1 including a vaporizing chamber for vaporized helium located radially inwardly from a chamber filled partly with liquid helium wherein the field winding is disposed, a cooling line extending from said vaporizing chamber to the damper and cold shielding, said mixing chamber for liquid helium being disposed in a coolant connecting head surrounding an end of the rotor shaft, an axial feed line for liquid helium connecting said mixing chamber with the field-winding chamber, and a line connecting said external cooling means to said mixing chamber.

5. Coolant circulatory loop according to claim 4 wherein said vaporizing chamber is constructed as an annular chamber disposed concentrically within said field-winding chamber and extending over the entire length of the field winding, said vaporizing chamber communicating with said field-winding chamber for receiving therefrom heated helium, said vaporizing chamber having therewithin, during rotation of the rotor, a cylindrical evaporating surface formed between a volume of radially outwardly disposed liquid helium and a volume of radially inwardly disposed vaporized helium.

6. Coolant circulatory loop according to claim 4 wherein the rotor shaft is formed with coolant outlet openings, and including a collecting chamber surrounding said coolant outlet openings formed in the rotor shaft, said mixing chamber in said coolant connecting head being disposed downstream from said collecting chamber in flow direction of the helium and being connected to said collecting chamber.

7. Coolant circulatory loop according to claim 6 wherein said vaporizing chamber is constructed as an annular chamber disposed concentrically within said field-winding chamber and extending over the entire length of the field winding, said vaporizing chamber communicating with said field-winding chamber for receiving therefrom heated helium, said vaporizing chamber having therewithin, during rotation of the rotor, a cylindrical vapor surface formed between a volume of radially outwardly disposed liquid helium and a volume of radially inwardly disposed vaporized helium, said coolant outlet openings formed in the rotor shaft being disposed at a greater radius from the rotor axis than that at which the cylindrical evaporating surface in said vaporizing chamber is disposed.

8. Coolant circulating loop according to claim 7 wherein said cooling outlet openings are formed in the end of the rotor shaft, the rotor shaft end being constructed as a suction pump.

9. Coolant circulatory loop according to claim 5 wherein the damper and cold shielding comprise a damping shield and a cold shield disposed radially outwardly from said damping shield, and including means for conducting the partly vaporized partial flow of helium that has flowed through the field winding solely to said damping shield for cooling the same, and means for conducting a flow of vaporized helium solely to said cold shield for cooling the same, said flow conducting means to said cold shield comprising a helium-vapor cooling line extending radially from said vaporizing chamber to said cold shield and passing through said cylindrical evaporating surface.

10. Coolant circulatory loop according to claim 6 wherein the damper and cold shielding comprises a damping shield and a cold shield disposed radially outwardly from said damping shield and having respective outlets for the helium supplied thereto, and including two additional collecting chambers formed in said coolant connecting head and surrounding and sealed against the rotor shaft, said additional collecting chambers being respectively connected to said helium outlets of said damping shield and said cold shield, and line means for connecting said additional collecting chamber to said external cooling means.

11. Coolant circulating loop according to claim 1, wherein said means for feeding the recooled partial flow of helium back to said mixing chamber comprise a connecting line connecting said external cooling means to said mixing chamber, and a pressure control valve connected in said connecting line.

12. Coolant circulating loop according to claim 4 including a heat exchanger disposed between said vaporizing chamber and said axial, liquid helium feed line.

* * * * *